(12) United States Patent
Riedl

(10) Patent No.: US 10,082,208 B2
(45) Date of Patent: Sep. 25, 2018

(54) METHOD OF MAKING A SEAL RING

(71) Applicant: Fachhochschule Muenster, Muenster (DE)

(72) Inventor: Alexander Riedl, Steinfurt (DE)

(73) Assignee: FACHHOCHSCHULE MUENSTER, Muenster (DE)

( * ) Notice: Subject to any disclaimer, the term of this patent is extended or adjusted under 35 U.S.C. 154(b) by 239 days.

(21) Appl. No.: 14/762,402

(22) PCT Filed: Feb. 18, 2014

(86) PCT No.: PCT/EP2014/000438
§ 371 (c)(1),
(2) Date: Jul. 21, 2015

(87) PCT Pub. No.: WO2014/127911
PCT Pub. Date: Aug. 28, 2014

(65) Prior Publication Data
US 2015/0345638 A1    Dec. 3, 2015

(30) Foreign Application Priority Data

Feb. 19, 2013    (DE) .......................... 10 2013 002 753

(51) Int. Cl.
*F16J 15/10*    (2006.01)
*F16J 15/06*    (2006.01)

(52) U.S. Cl.
CPC .......... *F16J 15/108* (2013.01); *F16J 15/062* (2013.01); *F16J 15/104* (2013.01); *Y10T 29/49771* (2015.01); *Y10T 29/49773* (2015.01)

(58) Field of Classification Search
CPC ........ F16J 15/108; F16J 15/104; F16J 15/062; Y10T 29/49773; Y10T 29/49771
See application file for complete search history.

(56) References Cited

U.S. PATENT DOCUMENTS 3,926,445 A * 12/1975 Farnam ................... B05C 1/003
                                                277/610
3,939,892 A *  2/1976 Farnam ................... F02M 19/00
                                                156/252

(Continued)

FOREIGN PATENT DOCUMENTS

| DE | 1923482 A  | 11/1970 |
| DE | 4142600 A  | 7/1993  |
| DE | 10221731 A | 12/2003 |

*Primary Examiner* — David Bryant
*Assistant Examiner* — Lawrence Averick
(74) *Attorney, Agent, or Firm* — Andrew Wilford

(57) ABSTRACT

The invention relates to a method for producing a sealing element, in particular a sealing ring, for sealing a connection of two flanges, of which at least one has a non-plane sealing surface, wherein at a plurality of circumferential positions (UP1 to UPn) lying in the circumferential direction of at least one flange, preferably of both flanges, in particular circumferential positions that are equidistant from each other, a distance value between the sealing surfaces of the flanges facing each other is determined at several locations that lie one behind the other in a direction perpendicular to the circumferential tangent, in particular in a radial direction, for each of the circumferential positions and a single thickness value is determined from the several distance values of each circumferential position and a sealing element is produced in dependence on all thickness values, which depend on the circumferential position, which sealing element has a thickness that depends on the circumferential position, which thickness is constant at each of the circumferential positions corresponding to the flanges in a direction perpendicular to the circumferential tangent, in particular in the radial direction, and corresponds to the determined thickness value of the respective circumferential position.

12 Claims, 2 Drawing Sheets

(56) References Cited

U.S. PATENT DOCUMENTS

| | | | | |
|---|---|---|---|---|
| 5,391,333 | A * | 2/1995 | Stecher | B21H 8/00 264/220 |
| 5,403,532 | A * | 4/1995 | Stecher | B21H 8/00 264/153 |
| 6,485,809 | B1 * | 11/2002 | Minor | F16J 15/102 277/407 |
| 7,520,511 | B2 * | 4/2009 | Mori | F16J 15/062 277/611 |
| 8,110,016 | B2 * | 2/2012 | McCollam | B01D 29/00 210/450 |
| 9,615,165 | B2 * | 4/2017 | Herold | H04R 1/2811 |
| 2003/0042688 | A1 * | 3/2003 | Davie | F16J 15/061 277/590 |
| 2006/0151960 | A1 * | 7/2006 | Sadowski | F16J 15/0881 277/592 |
| 2008/0000289 | A1 * | 1/2008 | Furuse | F16J 15/062 73/46 |
| 2009/0229106 | A1 * | 9/2009 | Nikamoto | F16J 15/0818 29/527.1 |
| 2014/0077460 | A1 * | 3/2014 | Mori | F16J 15/061 277/591 |
| 2015/0204270 | A1 * | 7/2015 | Davidson | F02F 11/002 277/593 |
| 2015/0369170 | A1 * | 12/2015 | Haberer | F02F 11/002 277/593 |
| 2017/0184199 | A1 * | 6/2017 | Furubayashi | F16J 15/062 |

* cited by examiner

METHOD OF MAKING A SEAL RING

CROSS REFERENCE TO RELATED APPLICATIONS

This application is the US-national stage of PCT application PCT/EP2014/000438 filed 18 Feb. 2014 and claiming the priority of German patent application 102013002753.5 itself filed 19 Feb. 2013.

FIELD OF THE INVENTION

The invention relates to a method of making a sealing element, in particular a seal ring for connecting two flanges of which at least one has a nonplanar sealing face.

BACKGROUND OF THE INVENTION

Seals are generally used for sealing connections of flanges, for example that are typically used in the chemical, petrochemical or pharmaceutical industries and in power plants. Sealing elements are always necessary when there is unevenness in the opposite sealing faces of at least one of the flanges involved, which is often the case.

The purpose of such a sealing element is that it undergoes plastic, elastoplastic or elastic deformation during assembly such that any existing unevenness in the at least one sealing face is compensated for. For this reason, a sealing element is often made of a softer material than the flange material.

It is problematic that considerable unevenness in at least one sealing face of the flanges involved or the total of unevenness in the two sealing faces involved can no longer be compensated for by traditional seals, in particular when such unevenness amounts to more than 10 mm.

Such considerable unevenness can occur due to strong thermal loads in the flange-making process, for example, in particular when the flanges are made of steel and have an enamel coating, for example, in order to achieve a chemical resistance.

Applying the enamel coating requires high-temperature heating of the parts to be enameled and therefore also the flanges, so there may be considerable deformation of the parts and thus also the flanges, so that even a sealing face of a flange that was originally made flat, for example, may have a substantial unevenness, for example, greater than 10 mm, after application of the enamel layer.

When such considerable unevenness occurred in the past, it has been necessary to repeat the enameling process for lack of availability of suitable seals. To do so, the old layer of enamel has to be removed, and if necessary the sealing faces would be smoothed and recoated.

However, unevenness of this magnitude can occur not only when there is a thermal load on the flanges, but also due to aging effects, for example, and the resulting distortion of the flanges or parts adjacent them.

OBJECT OF THE INVENTION

Thus, one object of the invention is to provide a method whereby a sealing element can be provided for a sealing connection of two flanges of which at least one has a nonplanar sealing face. It is thus essentially an object of the invention to provide by this method a sealing element, in particular a seal ring suitable for compensating for an unevenness of greater than 10 mm between the sealing faces of the flanges involved.

SUMMARY OF THE INVENTION

This object is achieved according to the invention in that a spacing between the opposite sealing faces of the flanges is determined at each of a plurality of angularly spaced locations on at least one flange, preferably of both flanges, these positions being angularly equidistant from one another in particular, at several locations in each of the angular positions, these locations being situated one after the other in a direction perpendicular to the tangent to the outer periphery and thus sequentially one after the other in the radial direction, for example, and then a thickness value is determined from the plurality of spacings of each angular position, and a sealing element is manufactured in accordance with all the thickness values, depending on the angular position, such that this sealing element has a thickness that depends on the angular position and is constant at each of the angular positions corresponding to the flanges, in a direction perpendicular to the tangent to the outer periphery, and therefore in the radial direction in particular, and it corresponds to the thickness value determined for the respective angular position.

It is thus an essential core idea of the invention to determine spacings between the sealing faces of the flanges and thus to take into account the unevenness specifically thereby determined in the manufacture of a sealing element.

However, it is also an essential core idea of the invention not to transfer the unevenness that occurs in the sealing faces of the flanges involved as a negative copy to a surface profile of a sealing element to be produced because this would result in full surface contact between the sealing element and the sealing faces of the flanges involved, which would necessitate extremely high joining forces to achieve a tight connection of the flanges, and instead according to the invention only a single thickness value is to be determined from the plurality of spacings of each angular position, this thickness value corresponding to the thickness with which a sealing element to be manufactured is produced at a corresponding angular position, and this thickness is then constant according to the invention in the aforementioned direction perpendicular to the tangent to the outer periphery, which means that in the case of the flange connection to be produced, a linear pressure of the sealing element between the sealing faces of the flanges can be achieved that permits a better tightness in comparison with surface pressure.

With regard to the method according to the invention, it should be pointed out that the spacings thereby determined need not necessarily correspond to the spacings that would exist between the sealing faces of the two flanges if the two flanges were attached to one another when a connection is established, including a sealing element. To be sure, the spacings thereby determined may describe precisely such spacings; however, it may also be provided that the spacings are values that occur when the two flanges involved are positioned at a greater spacing from one another than would be the case with a fastening having a suitable seal inserted in between.

Namely, in a preferred variant of the method according to the invention, it may be provided that each of the aforementioned thickness values is calculated from the respective spacings plus or minus a constant.

If one thus assumes, for example, that the two flanges are in contact with one another at their sealing faces when the spacings are determined or at least the spacing between the sealing faces is smaller than the required minimum thickness of a sealing element that is to be manufactured, then a thickness value of each angular position can be calculated from the respective spacings plus a constant value to achieve this minimum thickness of the sealing element, so that a sealing element to be manufactured has at least this minimum thickness at its thinnest location.

It may likewise be provided according to the invention that, for the determination of the spacings, the two flanges are positioned opposite one another at a spacing greater than the required or allowed maximum thickness of a sealing element that is to be produced later according to the process and inserted in between, so that a required thickness value for each angular position of a sealing element to be produced later can be calculated from the spacings minus a constant value, to thereby obtain the desired minimum thickness or average thickness or maximum thickness of the sealing element to be made later.

In particular it should be pointed out that the values to be used as spacings may also include the values that would be obtained if the two flanges that are to be connected later were arranged at a certain spacing from one another but specifically are not even arranged opposite one another for the purpose of determining according to the invention, as will be described in conjunction with an embodiment below.

Thus according to the invention the afore-mentioned multiple spacings of each angular position between the sealing faces of the flanges can be measured specifically, for which purpose then, in such an embodiment, the two flanges involved are to be oriented facing each other at any spacing in particular, but such that there is also the possibility of determining the spacings from other values that do not correspond directly to the specific spacings between the sealing faces of the flanges involved but instead correspond only to spacings between the sealing face of one of the flanges and a reference plane to be considered, for example.

Regardless of the type of specific determination of the multiple spacings in each of the angular positions from which a respective sealing value is determined for the manufacture of the sealing element, it is possible to provide that, in one possible embodiment, a thickness value is determined from the spacings for each angular position by forming the average of all spacings of the respective angular position or, in another embodiment that is preferred over the latter, by selecting the smallest of all spacings at the respective angular position.

In particular if the individual spacings of each angular position cannot be determined with a sufficiently high accuracy, then forming the average of all the spacings of a respective angular position to determine a thickness value can achieve a result that is satisfactory for the manufacture of a sealing element.

However, the choice of the smallest of all the spacings of each of the angular positions as the basis for determining a thickness value of this angular position to be used has the advantage that a sealing element produced according to this principle will always be contacted by these sealing faces within its sealing width at the location of the highest pressure and/or the location of the narrowest clearance between the sealing faces of the flanges involved, and thus the material of the sealing element can be pressed out of the line of contact of the highest pressure and into the surrounding areas, thereby ensuring an especially tight connection of the flanges.

In a preferred embodiment, the method according to the invention provides that the circumference of at least one flange and/or of both flanges shall be divided into discrete increments and thus a plurality of angular positions is defined, namely positions at which the spacings are determined in a direction perpendicular to the tangent to the outer periphery at the respective angular position, and thus in the radial direction in the case of an annular sealing element. The angular positions need not necessarily define locations directly on the outer periphery of a flange. It is essential for the invention that the angular positions define exactly the line on which the plurality of locations, where the spacings are determined between the sealing faces of the two flanges, are located.

In the case of a circular annular seal, but fundamentally with all forms of sealing elements, the angular positions may preferably represent the angular positions, for example, angle values between 0 and 360°, based on the midpoint of the sealing element and/or the at least one flange. Each angle then defines a radius, starting from the midpoint on which the locations where the spacings are determined between the sealing faces of the flanges are centered. In this case the angular positions may thus represent a coordinate of a polar coordinate system in which both the flanges and also the sealing element to be manufactured are taken into account.

For example, in the case of sealing elements that differ from a circular ring shape, for example, in angular sealing elements, the angular positions may also be expressed in Cartesian coordinates.

Thus, even with a very large number of angular positions, there are only discrete angular positions at a spacing from one another, for which a thickness value is determined for the seal to be produced later. Since according to the invention a sealing element is to be produced with these thickness values thereby determined at its angular positions corresponding to the flanges, it would be possible to provide an embodiment that would yield a stepped design with respect to the thickness of the sealing element angularly of the sealing element, and the spacing between the steps would correspond to the spacing of the individual positions from one another on the circumference.

To avoid such a stepped design angularly, it is possible to provide that angularly of the sealing element to be produced, its thickness between two angular positions corresponding and adjacent to the flanges would be adapted in accordance with the thickness values at these two respective angular positions, for example, by a thickness profile that increases or decreases monotonically angularly.

It is likewise possible to provide that another adaptation is to be performed between the thickness values of the respective angular positions determined according to the invention, for example, also by a mathematical fit of a polynomial or some other function for adjusting the thickness values in the areas between the discrete angular positions.

Thus a sealing element without a stepped thickness profile, in particular with a uniform angular thickness profile can be produced, such that its thickness is constant in the aforementioned direction perpendicular to the tangent to the outer periphery, for example in the radial direction in the case of an annular thickness element.

With the method according to the invention the plurality of spacings of each angular position are detected together with a respective coordinate value that identifies the location of the determination of the spacing in the direction perpendicular to the tangent to the outer periphery. In particular in the case of an annular sealing element and thus flanges designed with a circular shape, this coordinate value can identify the spacing of the location of the determination of the midpoint of the flange and thus the midpoint of the sealing element to be produced later and thus correspond to the radius coordinate. Each location at which a spacing is determined could thus be defined, for example, by a polar coordinate, namely by the angular position as an angle value and the aforementioned radius coordinate, wherein the spacings are determined according to the invention for each angle value at a plurality of radius coordinates.

It is possible according to the invention, in accordance with at least one of the coordinate values, in particular the radius value, to define the minimum internal cross section of the sealing element to be produced and/or to define the outside cross section of the sealing element in accordance with at least one of the coordinate values.

In the case of an annular sealing element, the outside diameter and the free inside diameter can be determined on the basis of these coordinate values. For example, it may be provided for this purpose that the minimum coordinate value (radius value), which is determined among all the coordinate values that identify the location of the minimum spacing between the sealing faces at each angular position, is to be used in order to thereby determine the internal diameter from this, for example, by taking into account an offset, in particular a negative offset.

In the same way, the required outer diameter of a sealing element can be determined from the maximum of all coordinate values (radius values) at which the respective minimum spacing between the sealing faces was determined at the respective angular positions, taking into account a preferably positive offset in particular.

In the method according to the invention a set of value pairs may be formed in which a respective value pair comprises a angular position (an angle value, for example, in the case of a circular sealing element to be produced) and a thickness value linked to this angular position. Such a set of value pairs, where the number of pairs thus corresponds to the number of angular positions to be taken into account, can be used to produce a sealing element in a numerically controlled process, for example.

A sealing element, for example, can be produced by removal of material from a sealing blank that is flat on both sides, in particular by machining, and according to one embodiment such removal may take place from only one side, down to a thickness that corresponds to the thickness value of this angular position, at each angular position on the sealing element corresponding to the flanges.

It is also possible that, based on the sealing blank, material is removed from both sides, but it has been found that because of the flexibility of the usual sealing materials, it is not necessary to remove material from both sides.

According to an alternative a sealing element is made by structural application of material in accordance with the thickness determined at each angular position. For example, thermoplastic, for example elastomeric, materials could be used here to apply them on a base in the thickness required after heating, for each angular position, to thereby form the sealing element.

The method according to the invention may provide for the determination of the plurality of spacings in the respective angular positions in various ways.

According to one embodiment a plastic material between the sealing faces of the flanges is pressed between two flanges to be joined to one another specifically by fastening the flanges to one another, thereby creating an impression of the space between the sealing faces, and, after removal of the impression and/or the material forming the impression between the sealing faces, the respective spacings from the impression are determined at each of the angular positions. For this purpose the impression is considered, at least in terms of the measurement technology, in the same coordinate system as the flanges to conform thereto with regard to the angular positions.

This may be accomplished, for example, by the fact that the thickness of the impression is measured in the direction perpendicular to the tangent to the outer periphery at several locations in each corresponding circumferential direction, as mentioned in the introduction, in particular in combination with a coordinate position of the respective measurement site, based on this aforementioned direction. Locations where the thickness is measured include only those situated on the impression between the sealing faces. Each thickness measured on the impression thus corresponds directly to a spacing of the flange sealing faces from one another. Therefore, in this case, the determination of the spacings refers to a measurement of the spacings.

Thus, as described above, the method according to the invention can be carried out either by forming the average or by seeking the minimum spacing and thus the smallest impression thickness from the plurality of spacings at a respective corresponding angular position, i.e. a thickness value is determined for the sealing element to be produced, optionally taking into account a constant value to be added or subtracted.

To avoid having to make an impression for the purpose of specific measurement of the plurality of spacings at the angular positions, an alternative embodiment may also provide for the two flanges that are to be joined together specifically to be attached to one another at any spacing, in particular using spacers, and three spacers can to be used to implement a three-point contact of the sealing faces with one another and thereby achieve a secure fastening of the flanges to one another for carrying out the method according to the invention.

As mentioned above, what is important here is not maintaining a certain spacing between the sealing faces of the flanges fastened to one another because the spacings thereby determined can be converted into the required thickness values for the production of a specific sealing element by taking into account a constant value.

In the case of such a specific arrangement of the flanges to be joined together later using the sealing element thus produced, it may now be provided that the plurality of spacings is to be measured using a measurement device at each of the angular positions.

For example, a scanning measurement device that is guided in a direction perpendicular to the tangent to the outer periphery at this angular position, may be used at each angular position and thus in the case of circular flanges, for example, it may be guided in a radial direction between the sealing faces of the flanges in order to measure the spacings between the sealing faces at a plurality of locations situated one after the other in this direction.

As described above, a thickness value for the sealing element to be produced later can be determined from this plurality of spacings for each angular position by forming an average or by seeking the minimum value as well as optionally a constant value that is to be added or subtracted.

It should also be pointed out that, instead of a scanning measurement device, a measurement device can also be guided between the sealing faces of the flanges at each angular position, so that the plurality of spacings can be determined optically and therefore without actual contact. For example, a laser spacing measuring device may be brought into contact with the sealing face of one of the flanges for this purpose, to then align the laser beam in the direction of the opposite sealing face and to measure a respective spacing.

A different solution may in turn be that with the specific arrangement of the two flanges at a spacing from one another, as described above, a laser scanner that performs measurements in polar coordinates, for example, is arranged as a measurement device between the flanges, for example, on their central connecting axis.

Such a laser scanner can measure the respective polar coordinates of the surfaces of the two sealing faces of the opposite flanges, based on the midpoint of the coordinate system on which it is based, and can thus determine from the measured values thereby formed the spacings required according to the invention between opposite locations on the two flange sealing faces for the plurality of angular positions.

As already indicated above, it is also possible to provide for the determination of the plurality of spacings required according to the invention not to be performed on the plurality of angular positions by a specific spacing measurement between the sealing faces of the opposite flanges but instead to provide an alternative embodiment of the method, such that a plurality of spacings between the sealing face of one of the flanges and a flat reference plane is determined at the angular positions in a direction perpendicular to the tangent to the outer periphery.

For example, such an embodiment according to the invention may be used when one of the flanges has a sufficiently flat sealing face, so that the determination of the spacings with respect to a flat reference plane supplies a sufficient accuracy in the determination of the required thickness values instead of the second sealing face of the flange that is considered to be essentially flat. It is possible to provide that for the determination of the spacings between the sealing face of one flange and a flat reference plane, a measurement device which comprises the reference plane itself or at least defines the reference plane, is attached to the flange that is to be measured in the method according to the invention, such that the spacings then determined between the sealing face and the reference plane can be converted into spacings between the sealing faces of the two flanges.

In particular when at least one of the flanges involved cannot be assumed to have a sufficiently flat design, the method according to the invention may also provide for the measurement of a flange relative to a flat reference plane to be performed in the same way for each of the two flanges involved and then for the two flanges to be converted separately for the multiple spacings between the respective sealing face and the reference plane, determined for each angular position, and convert them into the required spacings between the sealing faces of the two flanges. This is possible without a problem mathematically because a flat reference plane was used for the measurement of each of the two flanges and then the respective reference planes can be brought into correspondence mathematically for the determination of the spacings between the sealing faces of the two flanges.

BRIEF DESCRIPTION OF THE DRAWING

An embodiment of the invention will now be described in greater detail with reference to the figures. Therein.

SPECIFIC DESCRIPTION OF THE INVENTION

Figure 1:
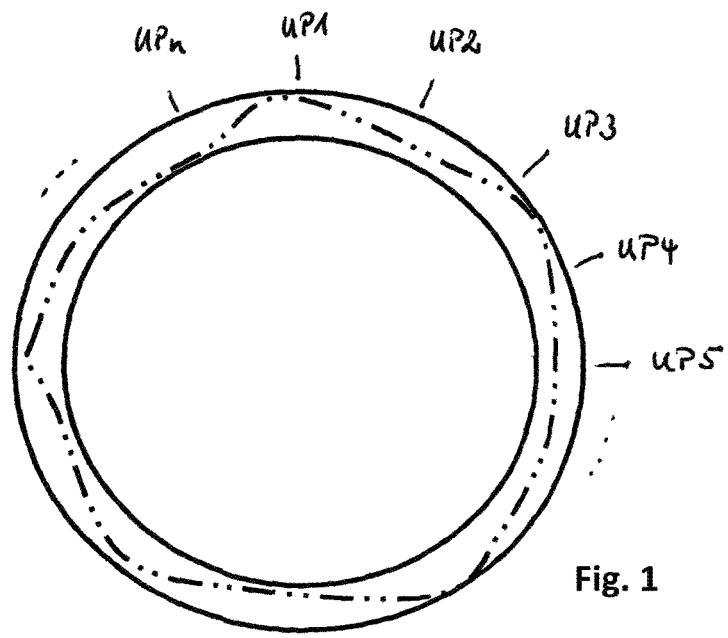
FIG. 1 is a top view of a face of a flange to be sealed.

In a first type of consideration, FIG. 1 is a top view of the sealing face of a flange where a plurality of spacings between the opposite flange sealing faces is measured at equidistantly spaced locations UP1 to UPn on the circumference, shown here symbolically, perpendicular to the tangents to the circumference and thus within the sealing face region in the radial direction, such that the dash-dot-dot line here represents a connecting line between the spacings of the individual angular positions that have the smallest absolute value and thus represent the location of the closest spacing between the two flange sealing faces in the radial direction that is being considered here.

Figure 2:
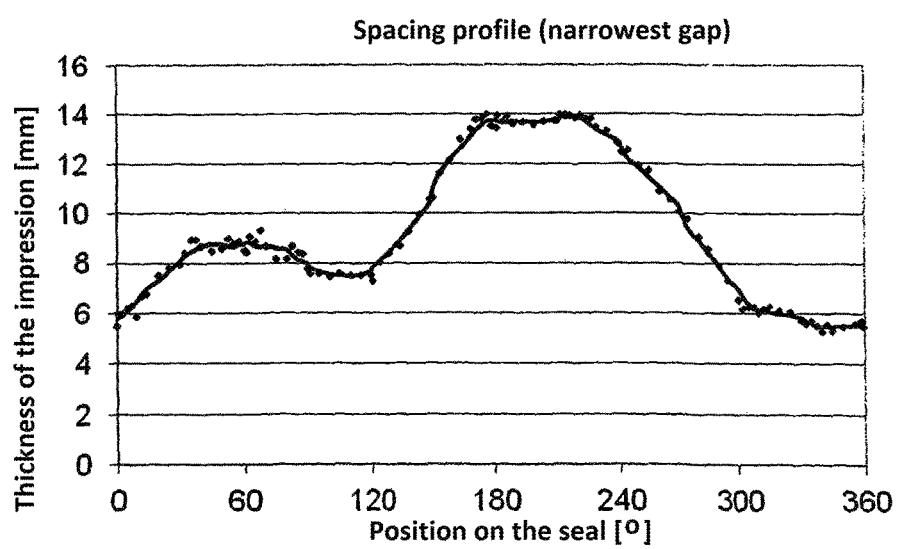
FIG. 2 is a graph illustrating the thickness variations around the flange to be sealed.

If one considers the outer periphery of the flange sealing face, as shown in FIG. 1 in a developed view, for example, in a range of 0 to 360° of the circumference with respect to the midpoint, then FIG. 2 shows an elevation profile and/or the narrowest clearance between the opposite sealing faces over this developed view, regardless of the radial position of this clearance region. In the case of an impression with a plastically deformable material, this elevation profile may represent the minimum thickness of the impression.

According to the invention, a sealing element is to be manufactured, in particular an annular sealing element is to be manufactured here that has a thickness that, in corresponding angular positions and thus with the same developed view as that shown in FIG. 2, depends on the angular position and/or the developed position and corresponds to the narrowest clearance according to the line in FIG. 1, optionally taking into account a positive or negative offset to ensure the desired minimum thickness of the sealing element.

The seal here is manufactured so that it has a constant thickness, as measured over its total radial width in each angular position, in particular the angular positions UP1 through UPn described here specifically, such that this thickness of the sealing element exists varies only angularly, i.e. the thickness here depends only on the angular position.

An annular seal produced according to these specifications can thus also be seen in FIG. 1, wherein the line shown there then automatically symbolizes the line of the greatest pressure between the two flange sealing faces, based on the sealing element in question. This is apparent because the sealing element between the two flange sealing faces is contacted at each location of the narrowest clearance between the flange sealing faces.

When the flanges are fastened to each other, sealing material is thus pressed out of this linear region into surrounding regions, which is possible in the present case because in the surrounding regions, in addition to the line shown here, the spacings between the sealing faces of the two flanges are greater than the spacings precisely on this line.

Figure 3:
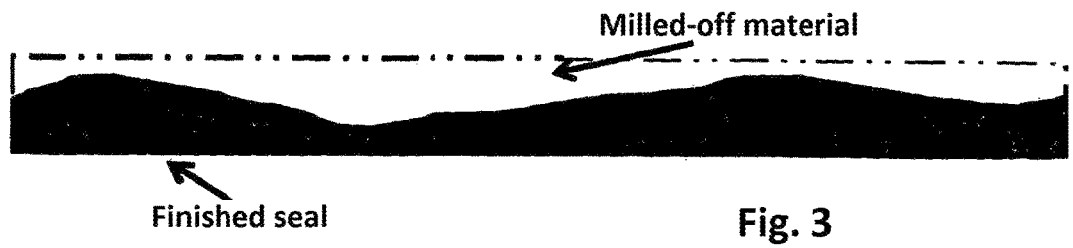
FIG. 3 is an edge view of a part of the flange.

FIG. 3 illustrates that a sealing blank with a constant thickness initially distributed over the circumference can be produced by machining of material, starting from the flat top side according to the thickness specifications for each angular position and/or according to the developed view shown in the figures.

Production may provide, for example, that a CNC machine operates a milling head in the radial direction, while maintaining a constant height above the sealing blank to thereby achieve a constant thickness in the radial direction in the production of an annular sealing element, this thickness being varied angularly according to the thickness specifications for the individual angular positions. In the same way, the thickness profile can be reduced angularly, for example, by means of a CNC machine to thereby achieve a constant thickness in the radial direction.

Figure 4:
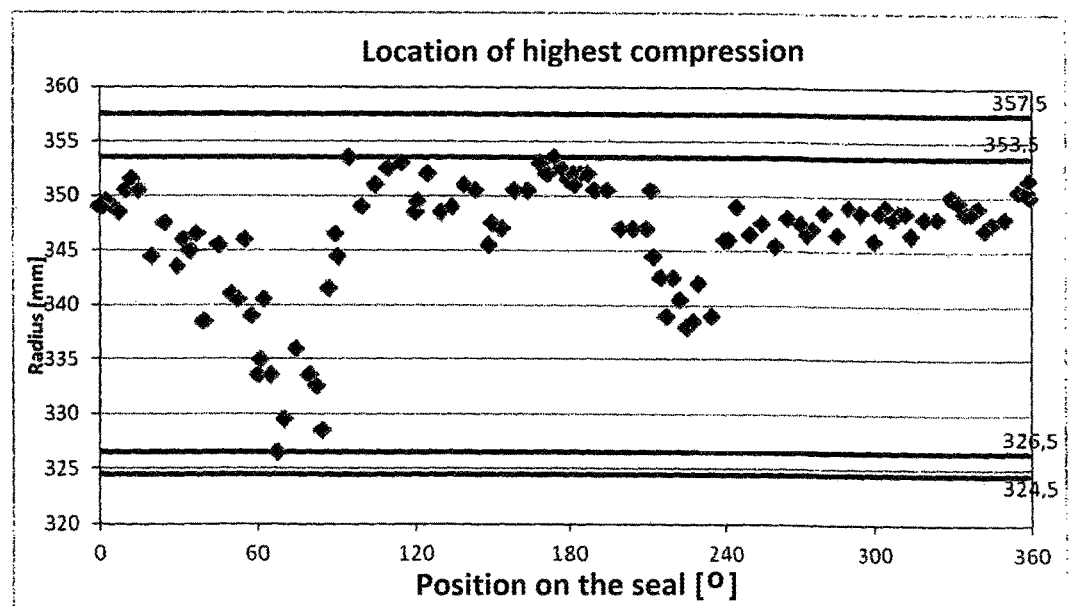
FIG. 4 is another graph illustrating the measurement points corresponding to FIG. 2.

FIG. 4 also illustrates the radial position of the line shown in FIG. 1 that is optionally also measured and stored, i.e. the radial spacing from the midpoint to each location of the narrowest clearance as a function of the angular position that is plotted here in degrees.

It is found that the location of the greatest pressure in an annular sealing element that is given by the line in FIG. 1, has both a minimum and a maximum radius value, so that in the production of an annular sealing element, the inside diameter of such an annular sealing element is to be manufactured as a function of the minimum radius value of the location of the greatest pressure and/or of the location of the minimum spacing between the sealing faces, optionally taking into account a safety margin which reduces the inside diameter.

In the same way, the maximum outside diameter to be manufactured can be determined on the basis of the maximum radial position of the location of the greatest pressure and/or of the smallest spacing of all the spacings, here optionally also taking into account a safety margin, so that the diameter of the sealing element to be manufactured is increased.

The invention claimed is:

1. A method of making a sealing element for connecting two axially spaced flanges having axially confronting sealing faces of which at least one is nonplanar, the method comprising the steps of:
determining a plurality of spacings between the opposite sealing faces of the two flanges at each of a plurality of angularly spaced locations on the one flange, the spacings of each location being determined at multiple positions that are situated one after the other in a direction perpendicular to a tangent to an outer periphery at the respective location;
determining for each angular location a single thickness value from the respective plurality of spacings determined at the respective angular location; and
manufacturing a sealing element that can engage against the locations on the one flange and that has, at each of a plurality of radially extending and angularly offset regions corresponding to the locations, the single thickness value determined for the respective location and that is constant in a direction perpendicular to a respective tangent to the outer periphery at each of the regions corresponding to the angular locations of the one flange.

2. The method according to claim 1, wherein each single thickness value is calculated from the spacings of the respective location plus or minus a constant minimum thickness of the sealing element.

3. The method according to claim 1, wherein the single thickness value is determined for each of the locations from the spacings of the positions of each angular location by
a) forming the average of all the spacings of the respective positions of the location or
b) selecting the minimum of all the spacings of the respective positions and using it as the single thickness value therefor.

4. The method according to claim 1, wherein angularly of the sealing element, its thickness between two angular locations adjacent to and corresponding to the flanges is adapted as a function of the single thickness values at the respective angular locations by means of a thickness profile that increases or decreases monotonically angularly.

5. The method according to claim 1, wherein the spacing of each position of each angular location is detected together with a respective coordinate value that identifies the locus of the determination in a direction perpendicular to the tangent to the outer periphery where the minimum internal free cross section of the sealing element and/or the maximum outside cross section of the sealing element is/are determined as a function of at least one of the coordinate values.

6. The method according to claim 1, wherein a sealing element is produced from a sealing blank that is flat on both sides by removal of material by machining from only one side down to a thickness that corresponds to the thickness value of each angular location.

7. The method according to claim 1, further comprising the step of:
pressing a plastic material between the sealing faces of the flanges by fastening the flanges to one another and thereby creating an impression of the space between the sealing faces, and,
after removal of the impression, determining the respective spacings from the impression at each of the angular location by measuring the thickness of the impression at each respective position in the direction perpendicular to the respective tangent to the outer periphery.

8. The method according to claim 1, further comprising the step of:
attaching the two flanges to one another at a spacing using spacers in a three-point contact of the sealing faces, and
measuring the spacings using a measuring device at each position.

9. The method according to claim 8, wherein the measurement device is formed by a scanning or optical measurement device that measures a plurality of spacings and is guided in a direction perpendicular to the tangent to the outer periphery between the sealing faces of the flanges at each position.

10. The method according to claim 8, wherein the measurement device is formed by a laser scanner that is arranged between the flanges at their central connecting axis.

11. The method according to claim 1, further comprising the step of:
determining a plurality of spacings between the sealing face of one of the flanges and a flat reference plane in the angular locations in a direction perpendicular to the tangent to the outer periphery by fastening a measurement device onto this flange that forms the reference plane; and
converting this reference plane or these spacings to spacings between the sealing faces of the two flanges.

12. The method according to claim 11, wherein the same method of determination is also performed with respect to the other flange, and the spacings between the sealing face and the reference plane, determined for both flanges separately for each angular location, are converted into spacings between the sealing faces of the two flanges.

* * * * *